United States Patent [19]

Peters et al.

[11] Patent Number: 4,679,194
[45] Date of Patent: Jul. 7, 1987

[54] LOAD DOUBLE TEST INSTRUCTION

[75] Inventors: Tulley M. Peters, Round Rock; William C. Bruce, Jr., Austin, both of Tex.

[73] Assignee: Motorola, Inc., Schaumburg, Ill.

[21] Appl. No.: 656,564

[22] Filed: Oct. 1, 1984

[51] Int. Cl.$^4$ ............................................. G06F 11/00
[52] U.S. Cl. .................................... 371/16; 364/300; 364/900
[58] Field of Search ....................... 371/19, 16, 15, 20, 371/25, 29, 21; 364/200, 900, 300

[56] References Cited

U.S. PATENT DOCUMENTS

| | | | |
|---|---|---|---|
| 3,921,142 | 11/1975 | Bryant | 364/900 |
| 4,024,386 | 5/1977 | Caudel | 364/200 |
| 4,128,873 | 12/1978 | Lamiaux | 364/200 |
| 4,206,503 | 6/1980 | Woods | 364/200 |
| 4,298,958 | 11/1981 | Takaki et al. | 371/19 |
| 4,308,581 | 12/1981 | Raglunathan | 371/19 |
| 4,315,313 | 2/1982 | Armstrong | 371/19 |
| 4,604,694 | 8/1986 | Hough | 364/300 |

Primary Examiner—Michael R. Fleming
Attorney, Agent, or Firm—John A. Fisher; Jeffrey Van Myers

[57] ABSTRACT

In a data processor having an instruction which requires the loading of the contents of two (2) successive locations in the address space during respective bus cycles, test circuitry is provided to selectively force the processor to twice load the contents of the same location upon execution of the instruction. Using this special load double test instruction, the processor is able to detect more precisely when the contents of the memory location changes in value as a result of the activity of other circuitry.

10 Claims, 5 Drawing Figures

4,679,194

LOAD DOUBLE TEST INSTRUCTION

FIELD OF THE INVENTION

The present invention relates generally to instructions for data processors and, more particularly, to an instruction for a data processor to test certain of its own internal operating characteristics.

BACKGROUND OF THE INVENTION

In typical data processors, the instruction set is designed to perform useful operations in a target application. In general, the task of verifying functionality of the data processor is left to the manufacturer. However, the user of the data processor, while expecting fully functional units, does not wish to sacrifice any portion of the instruction set to instructions which simplify the manufacturer's testing requirements but otherwise perform no useful function in the target system. As a result, manufacturers have devised various techniques for inducing the data processor to enter into a special "test mode" wherein the processor exposes the workings of its internals during the execution of "user" instructions. Using sophisticated testing systems, the manufacturer could thus view in detail the execution of each instruction by the data processor before shipment to the user. Unfortunately, as the power of the data processor is expanded to include new functions, the cost of the data processor increases not only because of the additonal hardware necessary to implement these new functions but also because of the cost of testing each new function. In extreme cases, the cost of testing may exceed the cost of the added hardware. Accordingly, manufacturers strive to make each new function as testable as possible. Although in some situations, instructions can be useful in testing other functions, such instructions are expected to perform "as usual", i.e. just as in the user application. No known data processor has an instruction which performs differently while the data processor is in the test mode than when the processor is in the normal execution mode.

SUMMARY OF THE INVENTION

Accordingly, it is an object of the present invention to provide an instruction in a data processor which performs a useful test function while the data processor is in a test mode, but a different function when the data processor is in the normal execution mode.

Another object of the present invention is to provide a data processor having an instruction which facilitates the testing of a portion of the data processor only when the data processor is in the test mode.

Still another object of the present invention is to provide an instruction for testing when the contents of a selected addressable location changes, but only when the data processor is in the test mode.

In carrying out these and other objects of the present invention, there is provided, in one form, a data processor which is adapted to read first and second operands from respective locations within a predetermined address space in response to executing a selected instruction when in a normal excution mode. When the data processor is in a test mode, the data prococessor is selectively forced to twice read the first operand from the respective location thereof in response to executing the same selected instruction. In the preferred form, the data processor executes a special instruction to set a control flag which selects the operating sequence of the selected instruction.

DETAILED DESCRIPTION OF THE INVENTION

Figure 1:
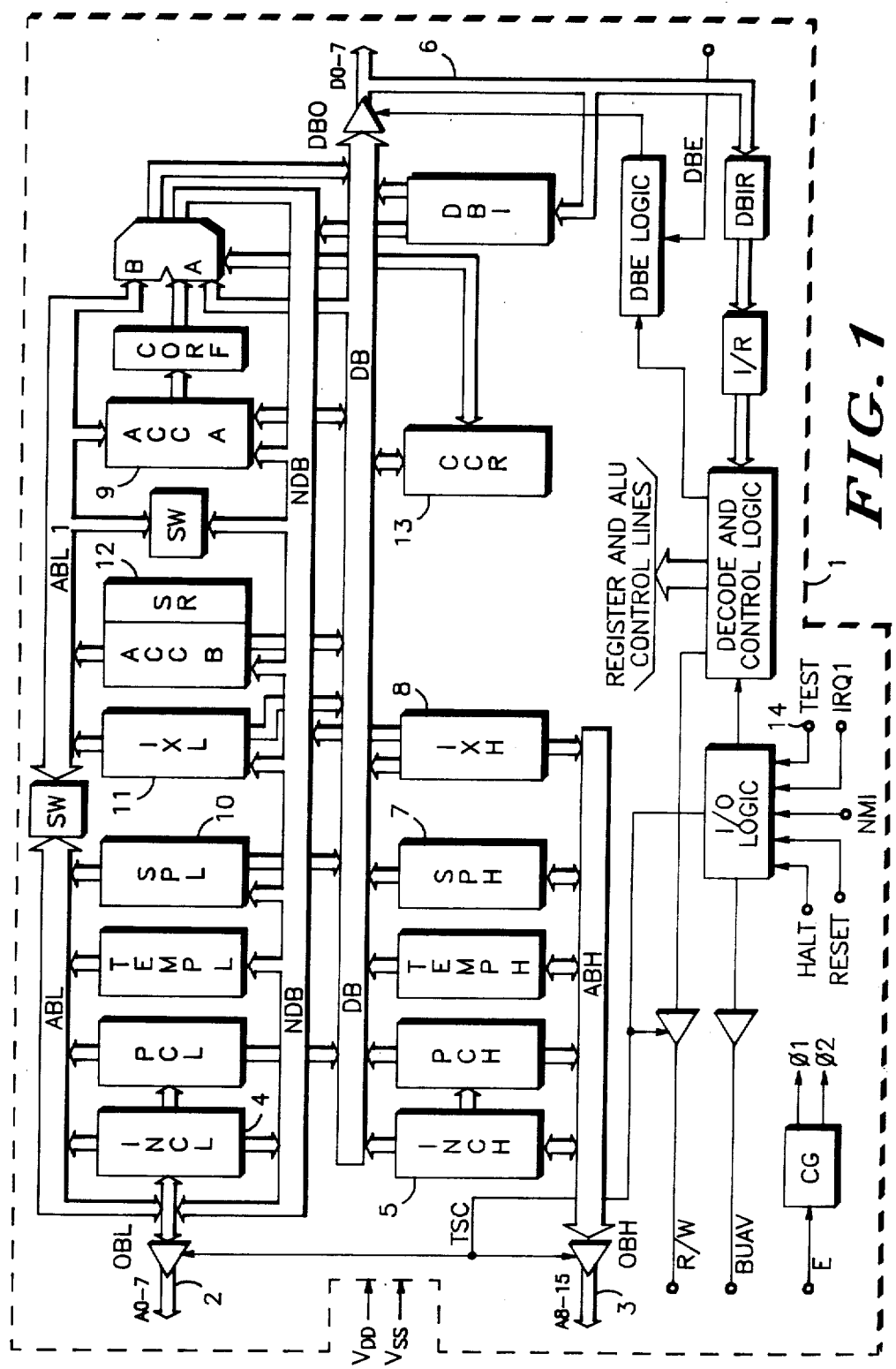
FIG. 1 is a block diagram of a data processor suitable for practicing the present invention.
Figure 2:
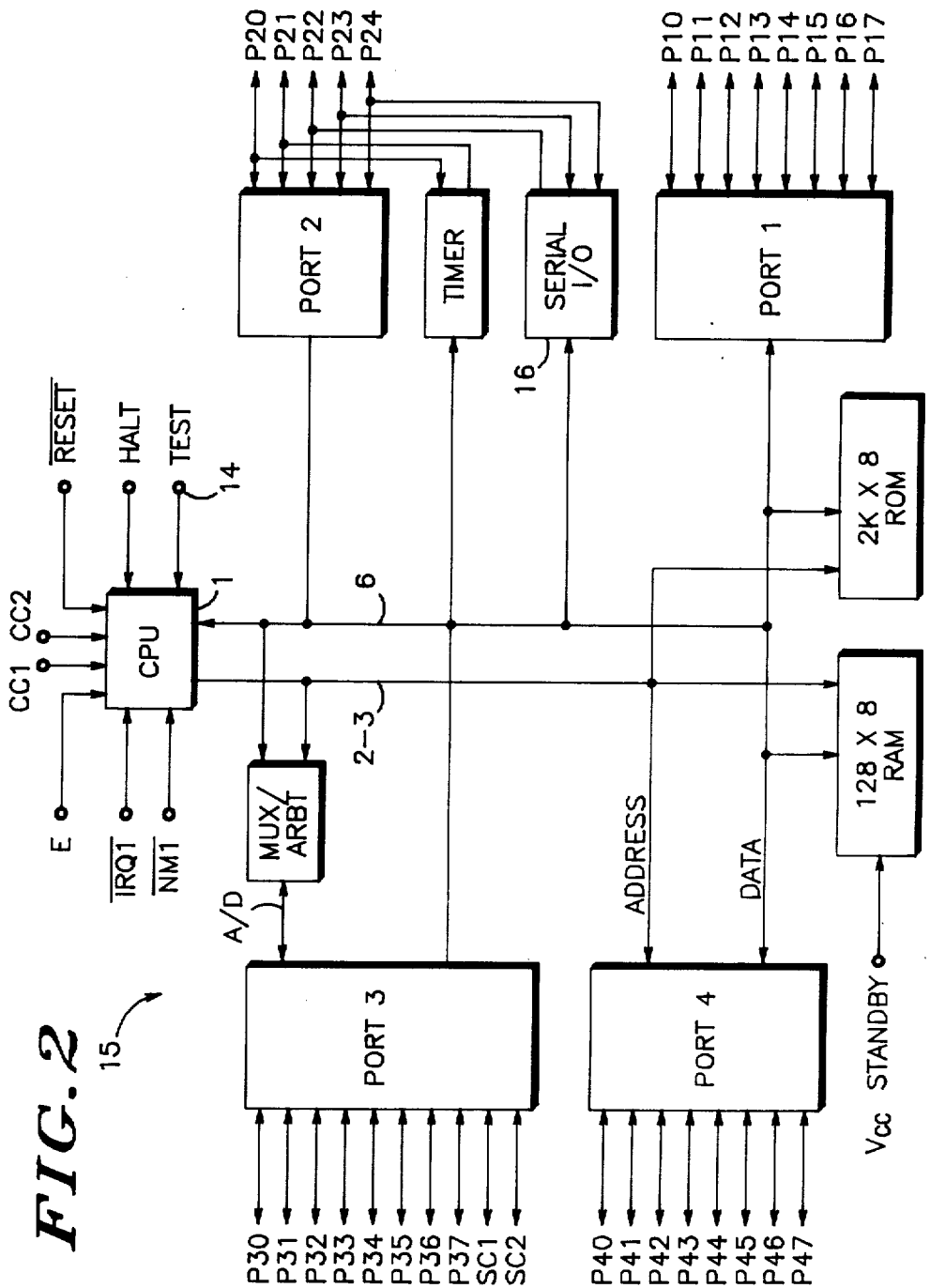
FIG. 2 is a block schematic illustrating the processor of FIG. 1 intergated with other functional elements to form a microcomputer.

Shown in FIG. 1 is a data processor 1 which is adapted to execute numerous instructions specifically designed to perform useful data manipulation and control functions. A detailed description of the construction and operation of the processor 1 may be found in U.S. Pat. No. 4,266,270. In particular, shown in FIGS. 2A, 2B, 2C and 2H thereof is a flow diagram of a "load double" instruction which can designate any of three (3) destination registers: load double stack pointer (LDS); load double index register (LDX); or load double data register (LOAD).

In general, the load double instruction, when executed by the processor 1 in the normal execution mode, will result in two (2) 8-bit bytes or operands being fetched and loaded into the specified register. If an immediate form of addressing is specified, the two operands are fetched from the instruction stream following the op code byte of the load double instruction. If one of the other addressing modes is specified, the two operands are fetched from consecutive addresses begining at the address specified in the balance of the instruction.

Upon initially decoding the op code portion of the load double instruction, the processor 1 processes the addressing mode portion of the instruction to determine the actual address of the first operand, either in the instruction stream or elsewhere in the address space. The processor 1 will then output this address on an address bus 2-3. Simultaneously, the processor 1 gates this address into an incrementor 4-5. When the first operand becomes available on an data bus 6, the processor 1 will load it into the upper half of the specified destination register, i.e. either the stack pointer (SPH 7), the index register (IXH 8) or the A accumulator (ACCA 9). By this time, the incrementor 4-5 has incremented the address so that it corresponds to the address of the second operand. The processor 1 then outputs this incremented address on the address bus 2-3. When the second operand becomes available on the data bus 6, the processor 1 will load it into the lower half of the specified destination register, i.e. either the stack pointer (SPL 10), the index register (IXL 11) or the B accumulator (ACCB 12). After then effecting the appropriate changes to the negative (N), zero (Z) and overflow (V) bits in a condition code register (CCR) 13, the processor 1 will proceed to load and execute the next instruction in the instruction stream.

In the preferred form, the processor 1 can be forced into a special test mode by applying a voltage of +5 volts to a test input pin 14. In this mode, the processor 1 provides signals on the address bus 2-3 and data bus 6 which reflect certain of the crucial internal activities. By observing these signals while the processor 1 is executing the various forms of each of the instructions in the instruction set, the manufacturer can verify the functionality of the processor 1. When integrated into a more complete system, such as the computer 15 shown in FIG. 2, the processor 1 may execute sequences of the verified instructions to verify the operation of other elements of the computer 15. A detailed description of the construction and operation of just such a computer 15, in which the processor 1 may form the central processing unit (CPU), may be found in U.S. Pat. No. 4,349,870.

Figure 3:
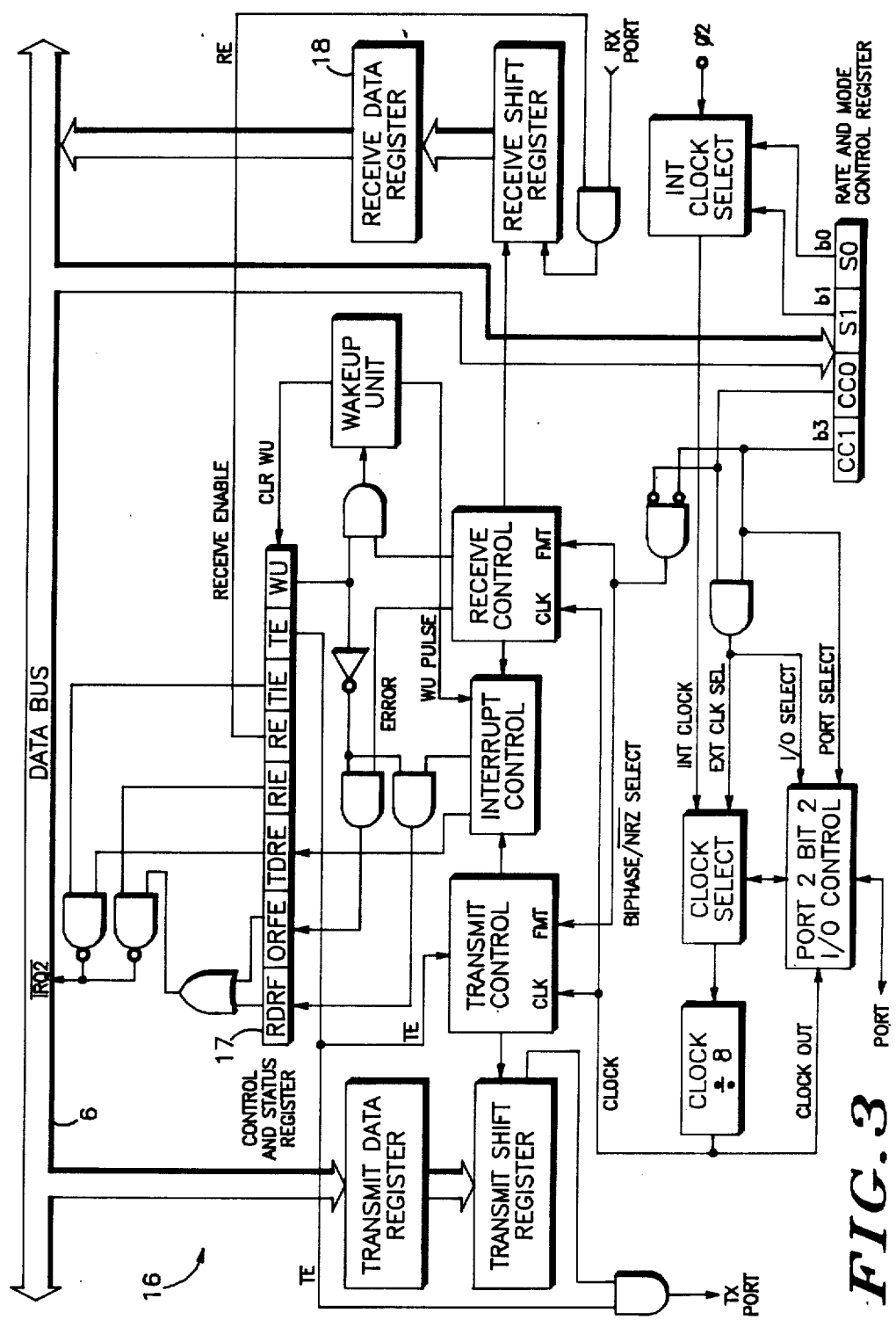
FIG. 3 is a block diagram of the serial communication interface shown in FIG. 2.

For example, it is desirable that the functionality of the serial input/output interface (SIO) 16 shown in FIG. 3 be verified with respect to both accuracy and timeliness. As explained fully in U.S. Pat. No. 4,346,452, the SIO 16 contains several registers which are mapped into the address space of the processor 1. The processor 1 enables the SIO 16 to receive externally generated serial communication messages by setting a receiver enable (RE) bit in a control and status register 17. Once enabled to receive, the SIO 16 sets a receive data register full (RDRF) bit in the control and status register 17 as soon as a full byte of the message, received from the external source (not shown), is loaded into a receive data register 18. If the processor 1 has set a receiver interrupt enable (RIE) bit in the control and status register 17, the SIO 16 will interrupt the processor 1 either upon setting the RDRF bit or if an error is detected. If the RIE bit is not set, the processor 1 must periodically read the control and status register 17 to see if the RDRF bit has been set by the SIO 16 to indicate that a full byte of the message is available in the receive data register 18.

During a test sequence, the processor 1 can capture each byte which has been received by the SIO 16 by executing a "load single" instruction, using the address of the receive data register 18 in the SIO 16 as the source and a selected one of the accumulators 2-3 as the destination. After all of the message bytes are received, the processor 1 can then verify the accuracy of the receiver portion of the SIO 16 by simply comparing each byte of the message actually received by the SIO 16 with the corresponding byte of the known, externally generated serial communication message.

If the test sequence is structured so that the processor 1 executes two "load single" instructions in a row followed by a compare of the two bytes just read, the processor 1 can effectively bracket the time at which the SIO 16 actually detects and captures the message byte. However, the processor 1 is unable to determine with any finer resolution the response time of the SIO 16. By adding a minimum of hardware to the processor 1 to modify the operation of the load double instruction in accordance with the present invention, this resolution may be significantly improved.

Figure 4:
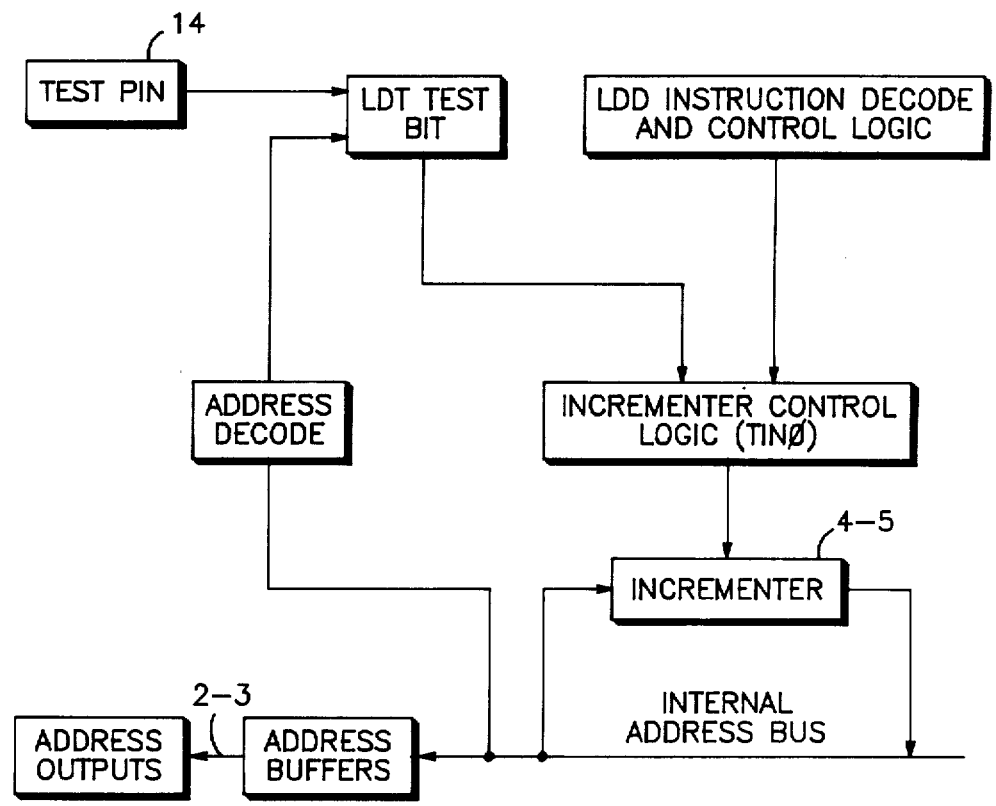
FIG. 4 is a block schematic of a circuit suitable for implementing the instruction of the present invention in the processor of FIG. 1.
Figure 5:
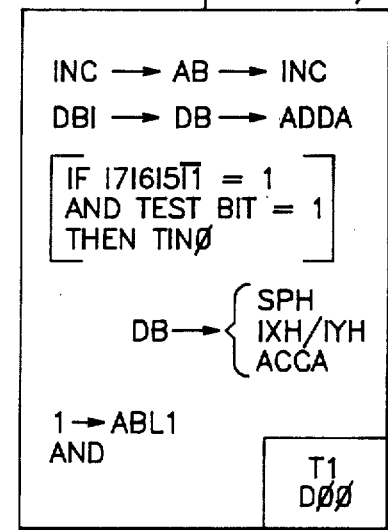
FIG. 5 is a flow diagram illustrating the execution of the instruction of the present invention by the processor of FIG. 1.
Figure 5:
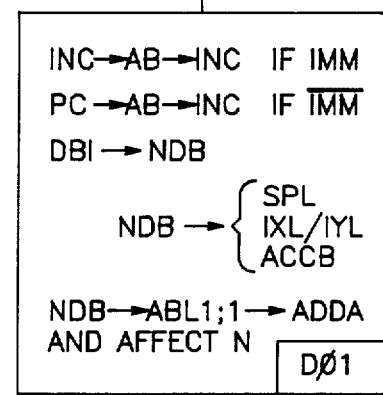
Figure 5:
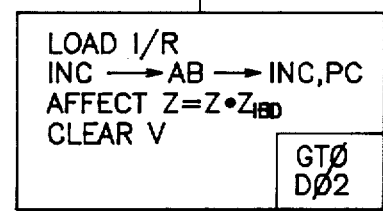

In the preferred form, the processor 1 includes a special "test bit" which can only be set by executing a predetermined load instruction while the processor 1 is in the test mode. A suitable circuit for controlling the setting of the test bit is shown in FIG. 4. In addition, the flow of the load double instruction in the processor 1 is modified as shown in FIG. 5, so that if the test bit is set the processor 1 will not gate the address of the "first operand" into the incrementor 4-5 during the first operand fetch. Thus, when the processor 1 fetches the "second operand", the same address is output on the address bus 2-3 and the same operand is fetched twice.

If this "load double test" instruction is substituted in the test sequence for the two consecutive load single instructions, the processor 1 will twice fetch the contents of the receive data register 18 in the SIO 16. If the two captured bytes are then compared and are found to be different, the processor 1 will have determined to within one bus cycle the precise time that the SIO 16 loaded the new message byte into the receive data register 18. Thus, the response time of the SIO 16 may be determined by generating the message byte earlier and earlier relative to the load double test instruction until the comparison shows no change.

Since the processor 1 cannot respond any faster than one bus cycle, this level of resolution provided by the load double test instruction is generally sufficient to verify the operation of the SIO 16. Of course, the load double test instruction may be used to test in a similar manner the operation of any other time critical component which is mapped into the address space. For example, this same test sequence may be used to determine when the SIO 16 sets the RDRF bit in the control and status register 17. Other equally suitable techniques will be readily apparent to those skilled in the art for forcing the processor 1 to execute the test form of the load double instruction rather than the normal form.

We claim:

1. In a data processor comprising instruction execution means for reading first and second operands from respective first and second consecutive locations within a predetermined address space in response to executing a single selected instruction, the improvement comprising:
  first means for establishing a control condition and for providing an execution control signal indicative of the state of said control condition; and
  second means, coupled to the instruction execution means and to the first means and responsive to the execution control signal, for forcing the instruction execution means of the data processor to twice read the first operand from the first location in response to executing said single selected instruction.

2. The data processor of claim 1 wherein the first means further comprises a test bit which is set in response to a mode control signal, the state of the test bit being indicative of said control condition.

3. The data processor of claim 2 wherein the first means may set the test bit only when the data processor is in a predetermined operating mode.

4. The data processor of claim 3 wherein the predetermined operating mode is a test mode.

5. The data processor of claim 3 wherein the second means are responsive to the execution control signal only when the data processor is in the predetermined operating mode.

6. In a data processor which reads first and second operands from respective first and second consecutive locations within a predetermined address space in response to executing a single selected instruction, a method comprising the steps of:
  establishing a control condition;
  providing an execution control signal indicative of the state of said control condition; nd
  in response to the execution control signal, forcing the data processor to twice read the first operand from the first location in response to executing said single selected instruction.

7. The method of claim 6 wherein the step of establishing said control condition is further characterized as setting a test bit in response to a mode control signal, the state of the test bit being indicative of said control condition.

8. The method of claim 7 further characterized in that the test bit may be set only when the data processor is in a predetermined operating mode.

9. The method of claim 8 further characterized in that the predetermined operating mode is a test mode.

10. The method of claim 8 further characterized in that the test bit is effective only when the data processor is in the predetermined operating mode.

* * * * *